(12) United States Patent
Fuchigami

(10) Patent No.: US 7,880,925 B2
(45) Date of Patent: Feb. 1, 2011

(54) APPARATUS AND METHOD FOR GENERATING AN IMAGE FILE WITH A COLOR LAYER AND A MONOCHROME LAYER

(75) Inventor: Takahiro Fuchigami, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1543 days.

(21) Appl. No.: 11/194,577

(22) Filed: Aug. 2, 2005

(65) Prior Publication Data
US 2007/0030527 A1  Feb. 8, 2007

(51) Int. Cl.
 H04N 1/60 (2006.01)
 G06K 15/00 (2006.01)
 G03F 3/08 (2006.01)
(52) U.S. Cl. .......... 358/1.9; 358/1.18; 358/2.1; 358/518; 358/520
(58) Field of Classification Search .......... 358/1.9, 358/518, 520, 482, 1.13–1.18, 2.1; 382/163, 382/182, 162; 349/106; 101/484; 345/629
See application file for complete search history.

(56) References Cited

U.S. PATENT DOCUMENTS 5,177,603 A * 1/1993 Kojima ............ 358/518
5,680,230 A * 10/1997 Kaburagi et al. ........ 358/520
6,278,529 B1 * 8/2001 Akimoto ............ 358/1.9
6,426,809 B1 * 7/2002 Hayashi et al. ......... 358/529
6,642,993 B2 11/2003 Megawa et al.
6,718,878 B2 * 4/2004 Grosso et al. ........... 101/484
6,982,799 B2 * 1/2006 Lapstun ............ 358/1.13
7,038,747 B2 * 5/2006 Lee et al. ............ 349/106
7,102,652 B2 * 9/2006 O'Donnell et al. ........ 345/629
7,110,137 B2 * 9/2006 Burgess et al. ......... 358/1.18
7,110,595 B2 * 9/2006 Inoue ............... 382/163
7,349,134 B2 * 3/2008 Kato ............... 358/482
7,576,890 B2 * 8/2009 Peiro et al. ........... 358/1.9
2003/0235334 A1 * 12/2003 Okubo ............... 382/182
2004/0012815 A1 1/2004 Fuchigami
2004/0057079 A1 * 3/2004 Ohsawa ............ 358/2.1
2005/0219264 A1 * 10/2005 Shum et al. ........... 345/629

FOREIGN PATENT DOCUMENTS

JP  3184256 B2  4/2001

* cited by examiner

Primary Examiner—James A Thompson
Assistant Examiner—Satwant K Singh
(74) Attorney, Agent, or Firm—Foley & Lardner LLP

(57) ABSTRACT

An apparatus and method for generating an image file having a color layer and a monochrome layer comprises reading an original image, generating color image data from the read original image, and generating monochrome image data from the read original image. First image processing is performed on the color image data, and a second image processing, different from the first image processing, is performed on the monochrome image data. The processed color image data and the processed monochrome image data are stored in the image file as the color layer and the monochrome layer, respectively.

16 Claims, 4 Drawing Sheets

APPARATUS AND METHOD FOR GENERATING AN IMAGE FILE WITH A COLOR LAYER AND A MONOCHROME LAYER

FIELD OF THE INVENTION

The present invention relates generally to image processing and, more particularly, to a system and method for generating a file comprising a color and monochrome version of an image.

BACKGROUND OF THE INVENTION

An image file may depict any number of elements including text, graphics, and pictures. In addition, the image file may represent a monochrome image (i.e., a black and white image) or a color image. The combination of the elements depicted in the image file, and whether the image is color or monochrome, impact the way in which the image file is generated and stored. For example, text elements require significantly less data than graphics or pictures. In addition, color images require significantly more data than monochrome images.

The image file may be stored on any type of medium, such as a hard disk drive or other form of non-volatile memory of a device, as well as transferable mediums like CD-ROMs and floppy disks. In addition, a user can request that the image file be displayed or printed or otherwise output in some manner. For example, a user can request that an image file be displayed on a computer monitor or be printed on a paper by a printer or other type of hardcopy device.

When a user requests that the image file be displayed or printed, the device on which the image is to be displayed or printed typically dictates the manner in which the image is presented. For example, if the image file is a color image, and the monitor on which the image is being displayed is monochrome, then the color image must be transformed to appear as a monochrome image. This situation also applies when a color image is printed on a monochrome printer.

In presenting a color image on a monochrome monitor or printing on a monochrome printer, the saved color image data must be converted to monochrome image data. This conversion from color to monochrome, at the time of presenting the image, results in a deterioration of the quality of the image. As a result, the quality of the converted monochrome image as displayed on a monitor or as printed by a printer is diminished.

SUMMARY OF THE INVENTION

According to an aspect of the invention, an image forming apparatus and method for generating an image file having a color layer and a monochrome layer comprises reading an original image, generating color image data from the read original image, and generating monochrome image data from the read original image. First image processing is performed on the color image data, and a second image processing, different from the first image processing, is performed on the monochrome image data. The processed color image data and the processed monochrome image data are stored in the image file as the color layer and the monochrome layer, respectively.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Figure 1:
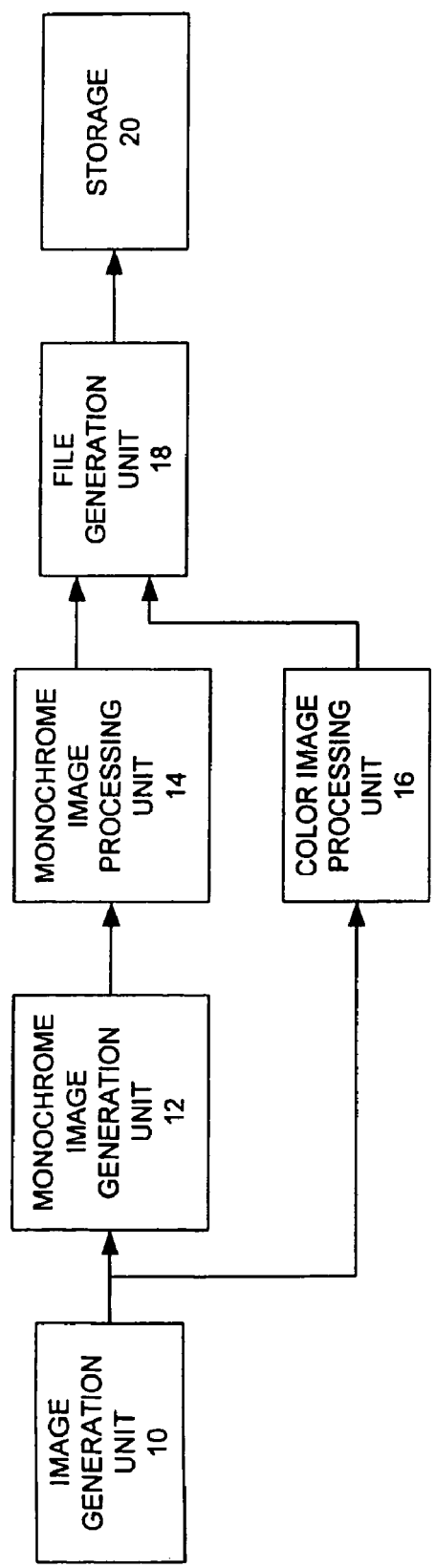
FIG. 1 is a block diagram of an image file generation system consistent with the present invention.

FIG. 1 is a block diagram of an image file generation system consistent with the present invention. As shown in FIG. 1, the system includes an image generation unit 10, a monochrome image generation unit 12, a monochrome image processing unit 14, a color image processing unit 16, a file generation unit 18, and a storage 20. This system can be implemented as a single unit, such as within a scanning unit or a multi-function peripheral (MFP). Alternatively, the system can be distributed among multiple components, such as a scanning unit, a computer, and a storage unit. Further, the system can be implemented in software, such as a device driver or plug-in application, in hardware, or any combination of the foregoing.

The image generation unit 10 generates image data, such as RGB color image data, from an original document. The image generation unit 10 may be implemented as a scanner or other type of image input device that is capable of generating image data. For example, if implemented as a scanner, the image generation unit 10 scan a light across the original document, and the light reflected off the original document is detected by sensors that convert the detected light into image data. The sensors preferably include color sensors, such as red, green and blue sensors, that are capable of detecting color images and generating color image data. Alternatively, the sensors may also include an achromatic sensor that can detect and generate black and white (i.e., monochrome) image data.

The monochrome image generation unit 12 generates monochrome image data from the image data output by the image generation unit 10, which is typically color image data. Alternatively, the image data output by the image generation unit 10 can be monochrome if using the achromatic sensor. If the image data is color, to facilitate the conversion to monochrome image data, a segmentation analysis may be applied to the color image data. The segmentation analysis divides the color image data into different regions depending upon the type of image present in that region. For example, the original document may have text regions, graphics regions, and/or photographic regions. Depending upon the region type, the monochrome image generation unit 12 may use a different algorithm that more optimally converts the color image data to monochrome image data. For example, the monochrome image data can be generated using different methods designated by a user according to the region and reproduce specific patterns for regions having pixels of similar color.

If using a gray scale (i.e., multiple levels between white and black, such as between 0 and 255) for the monochrome image data, then the color image data can be converted, for example, by using the highest color value of each pixel of the color image data as the value for the corresponding pixel of the monochrome image data. Alternatively, each pixel of the monochrome image data can be calculated as an average of the color values for the corresponding pixel. If using the segmentation analysis approach, the average value may be used for photographic or graphic regions, and the highest value may be used for text regions.

If the monochrome image data is simply black and white data, i.e., each pixel is either black or white, then the average or highest value of each pixel of the color image data can be compared to a threshold. If the average or highest value exceeds the threshold, then the corresponding pixel of the monochrome image data is white; otherwise, the corresponding pixel of the monochrome image data is black.

A monochrome image processing unit 14 processes the monochrome image data output from the monochrome image generation unit 12, and a color image processing unit 16 processes the color image data output from the image generation unit 10. The monochrome image processing unit 14 is configured to perform image processing functions tailored to monochrome image data, and the color image processing unit 16 is correspondingly configured to perform image processing functions tailored to color image data. For example, the monochrome image processing unit 14 can be configured to perform removal of isolated dot noise, whitening of pale color background pixels, and other image processing functions. The color image processing unit 16 can be configured to perform gamut mapping, color balance adjustment, color conversion (e.g., from RGB to CMY), and other image processing function. In general, the monochrome image processing requires less processing power than the color image processing. In both cases, segmentation or layout analysis may be performed to adjust the image processing performed in accordance with the type of image in a particular area.

A file generation unit 18 preferably generates a single file comprising the processed monochrome image data and the processed color image data as separate layers in the single file. For the purposes of the following preferred description, "image file" will refer to this single file comprising a color layer and a monochrome layer. It is understood that, alternatively, two linked files, one for the color layer and the other for the monochrome layer, could be generated. The file generation unit 18 receives the processed monochrome image data from the monochrome image processing unit 14, and receives the processed color image data from the color image processing unit 16 and generates the monochrome and color layers, respectively, from the received data. The separate layers of the image file are structured in a manner to allow for either the color image data or the monochrome image data to be provided to an output device, such as a printer or a display monitor. For example, the .pdf format allows for multiple layers of images to be stored in a single image file. Any format that allows for storing multiple layers of images in a single file comes within the scope of the invention.

It is also possible for the file generation unit 18 to compress the image file. The image file can be compressed using any of a number of well known image data compression algorithms to compress each layer of the image file. Alternatively, it is possible to compress the file based on differences in the data between the color layer and the monochrome layer. For example, the monochrome image data can be compressed by taking the difference between a weighted average of the color image data and the monochrome image data in accordance with the equation: $K'=K-(aR+bG+cB)$, where K is the monochrome image data pixel value, R, G, and B are the color image data pixel values, a, b, and c are the weighting coefficients, and K' is the compressed monochrome image data pixel value. Before generating the compressed monochrome image data in this manner, the color image data is preferably compressed. By compressing the monochrome image data in this manner, however, the color image data needs to be decompressed before the original monochrome image data can be regenerated because the decompressed color image data is used the regenerate the monochrome image data.

The storage 20 stores the image file generated by the file generation unit 18. The storage 20 can be implemented, for example, as a hard disk drive or other type of non-volatile memory. The storage 20 can be located in the scanning unit or MFP that generates the image data, in a workstation or PC of the user initiating the generation of the image file, in a file server, or any other allocated or desired location.

Figure 2:
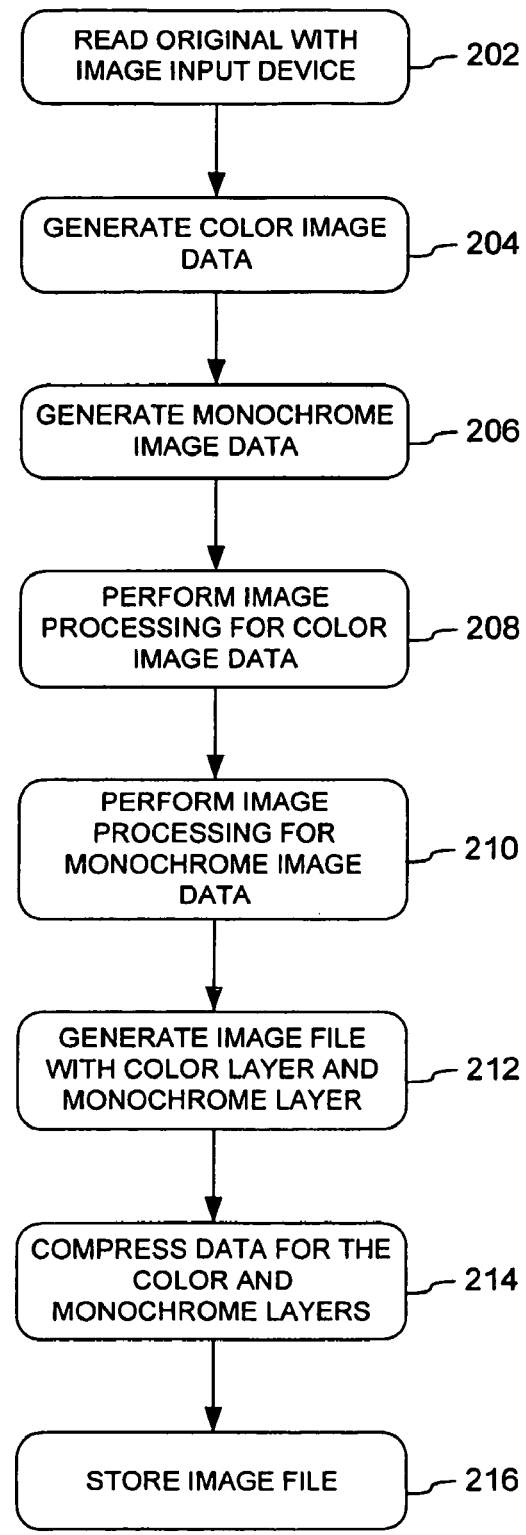
FIG. 2 is a flow diagram of an image file generation process consistent with the present invention.

FIG. 2 is a flow diagram of an image file generation process consistent with the present invention. As shown in FIG. 2, a user initiates the image file generation by having an original document read by an image input device (step 202). The original document can be one or more pages having color and/or monochromatic photographic, graphical or text regions. The image input device can be the image generation unit 10, as described above.

Based on the read original document, color image data is generated (step 204). The color image data is generated by the image input device and is preferably generated as RGB data. The color image data can be generated by red, green and blue color sensors in the image input device. The image input device can also have an achromatic sensor that detects black/white or monochromatic data.

In addition to generating color image data, monochrome image data is also generated (step 206). The monochrome image data can be generated directly from the just-generated color image data using the monochrome image generation unit 12. As described above, if using a gray scale for the monochrome image data, then the color image data can be converted to the monochrome image data by using the highest color value of each color pixel or using an average of the color values of each color pixel. If the monochrome image data is simply black and white data, then monochrome image data can be generated by comparing the average or highest value of each pixel of the color image data to a threshold. If the image input device has a K sensor, then the monochrome data can be based on the image data output from the K sensor instead of converting the color image data.

Image processing is performed on the color image data (step 208). The image processing can be performed by the color image processing unit 16. As described above, several different image processing functions or algorithms can be performed on the color image data. In addition, by using segmentation or layout analysis, the image processing can be tailored to the image region type.

Image processing is also performed on the monochrome image data (step 210). The image processing on the monochrome image data can be performed by the monochrome image processing unit 14. Like the color image processing, several different image processing functions or algorithms can be performed on the monochrome image data, and this image processing can be tailored to the image region type by using segmentation or layout analysis.

Having performed image processing on the color and monochrome image data, an image file is generated with a color layer and a monochrome layer (step 212). The generation of the image file can be performed by the image file generation unit 18. As described above, the image file is structured in a manner to allow either the color image data in the color layer or the monochrome image data in the monochrome layer to be selected and output to an output device such as a printer or a display monitor.

The generated image file can also be compressed (step 214). The compression can also be performed by the image file generation unit 18. The compression can be done using known image compression algorithms for each layer. It is also possible to compress the image file by using differences in corresponding pixel values of the color and monochrome image data, as described above. The compressed image file is then stored (step 216). The image file can be stored in the storage 20, which can be located, for example, in the image input device, in a workstation or PC, in a file server, or other appropriate location.

Figure 3:
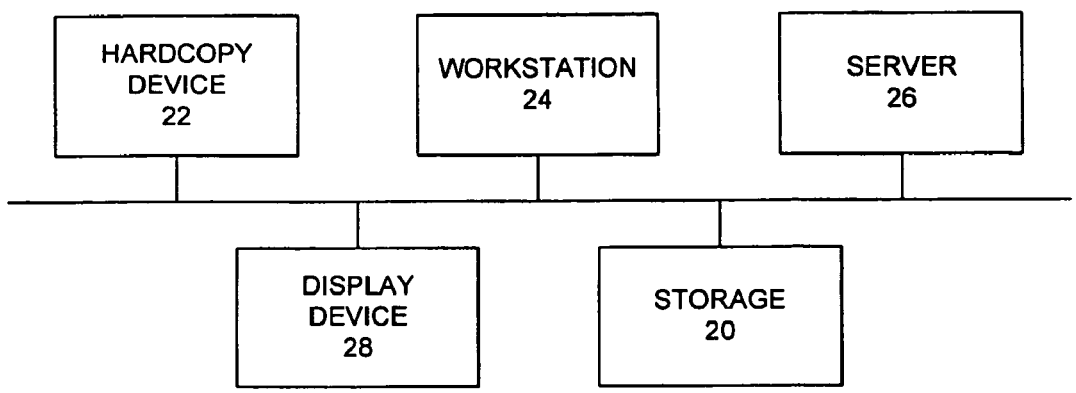
FIG. 3 is a block diagram of a system for using an image file generated in accordance with the process of FIG. 2.

With an image file having both a color layer and a monochrome layer, it is possible to use either one or the other layer based on the output device for the image file. As a result, the color or monochrome image receiving the color or monochrome layer can generate a more accurate reproduction of the original image. FIG. 3 is a block diagram of a system for using an image file generated in accordance with the process of FIG. 2. As shown in FIG. 3, the system includes a hardcopy device 22, a workstation 24, a server 26, a display device 28, and the storage 20 of FIG. 1. The devices in this system can be coupled together through a network, such as a LAN or the Internet, or can be coupled together locally, either directly or indirectly.

The hardcopy device 22 is a device capable of generating a hardcopy reproduction of an image. The hardcopy device 22 can be, for example, a printer, a plotter, or a multi-function peripheral (MFP) having a printing function. The hardcopy device 22 receives a print job from another device, such as workstation 24 or server 26, and generates a hardcopy of the file identified in the print job. The print job can be received via a network or a local connection.

The workstation 24 may be a PC, a mobile phone, a PDA, a magnetic card, or some combination thereof, or any other computing device. It preferably includes a CPU, a main memory, a ROM, a storage device and a communication interface all coupled together via a bus. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage, and is capable of storing an image file as generated according to the process of FIG. 2.

The communication interface for the workstation 24 provides a two-way data communication coupling, such as to a network. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information.

If the network connection is an Internet connection, the workstation 24 can transmit a requested code for an application program through the Internet, an ISP, the local network and the communication interface. The received code can be executed by the CPU in the workstation 24 as it is received, stored in the storage device, or stored in some other non-volatile storage for later execution. In this manner, the workstation 24 may obtain application code in the form of a carrier wave.

Like the workstation 24, the server 26 preferably includes a CPU, a main memory, a ROM, a storage device and a communication interface all coupled together via a bus. In addition to the processing functions that can be performed by the workstation 24, the server 26 can also include network and administrative functions. The server 26 may also store a plurality of documents or files, including image files generated in accordance with the process of FIG. 2, in a non-volatile storage area, such as a hard disk drive or NVRAM. These documents and files are accessible by other devices, such as the workstation 24, and can be provided to output devices, such as hardcopy device 22 and display device 28.

The display device 28 can be implemented as a monitor for the workstation 24 or the server 26 or as a television or other type of image displaying device. The display device 28 can be either color or monochrome (or one operating in alternative modes). In addition, the display device 28 can be a CRT, LCD or plasma-type display.

Figure 4:
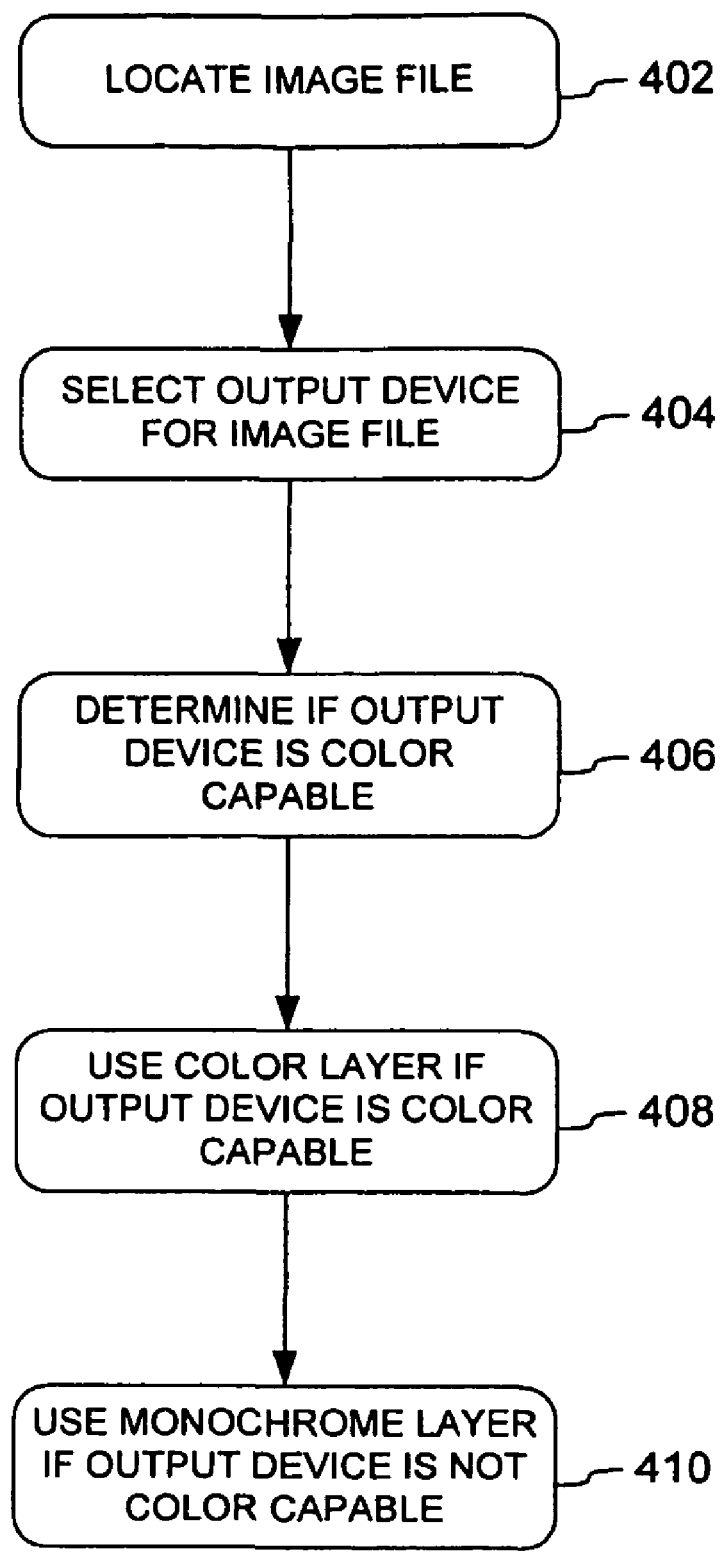
FIG. 4 is a flow diagram of a process for using an image file generated in accordance with the process of FIG. 2.

FIG. 4 is a flow diagram of a process for using an image file generated in accordance with the process of FIG. 2. As shown in FIG. 4, a user device first locates an image file (step 402). The image file is one generated according to the process of FIG. 2 and having a color layer and a monochrome layer. The image file can be one stored in the storage 20. The storage 20 can be an independent storage device or be part of a storage system on the workstation 24 or the server 26. The image file can also be stored at the hardcopy device 22, such as if the hardcopy device 22 is implemented as an MFP having a file storage system, typically referred to as a box. The user also selects an output device for reproducing the image file (step 404). The output device may be the display device 28 or the hardcopy device 22, or any other output device capable of reproducing the located image file.

Before reproducing the image file, it is determined if the output device is color capable (step 406). For example, the hardcopy device 22 may be limited to printing monochrome images or may also have the ability to generate color hardcopies, i.e., be color capable. Similarly, the display device 28 may be a monochrome monitor or may be a color monitor capable of displaying color images. To make this determination, the user device used to locate the image file and select the output device can be configured with programming or instructions that are implemented with a driver, a plug-in application or as part of the software application or operating system operating on the user device. The programming or instructions can determine if the selected output device is color capable, such as by reference to information stored at the selected output device or information stored at the user device identifying the selected output device as being color or monochrome.

If it is determined that the selected output device is color capable, then the color layer of the image file is provided to and used by the selected output device (step 408). Otherwise, the monochrome layer of the image file is provided to and used by the selected output device (step 410). Like the determination of the color capability of the selected output device, the provision of either the color or monochrome layer in response to the determination can be implemented as part of the same programming or instructions implemented with a driver, a plug-in application or as part of the software application or operating system operating on the user device.

According to the process of FIG. 4, the color capability of the output device determines which layer of the image file is provided to and used by the output device. This is done automatically without user input. Alternatively, it is also possible for instructions from the user to determine which layer is used, for example by being given the option or the user changing the applicable settings. For example, a user may request that a monochrome version of the image file be printed on a printer, even though the printer is color capable. In this instance, the monochrome layer of the image file would be provided to the printer instead of the color layer. Using the appropriate layer depending on the form of output provides better image quality of the outputted image.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A computing device configured to generate an image file having a color layer and a monochrome layer, comprising:
    a scanner for reading an original image;
    a color image data generator that generates color image data from the original image read by the scanner;
    a monochrome image data generator that generates monochrome image data from the original image read by the scanner;
    an image processor configured to perform a first image processing on the color image data and to perform a second image processing, different from the first image processing, on the monochrome image data, the second image processing including compressing the monochrome image data based in part on a weighted average value obtained from the color image data compressed in the first image processing;
    an image file generator configured to store the processed color image data in the image file as the color layer and the processed monochrome image data in the image file as the monochrome layer.

2. A computing device according to claim 1, the computing device corresponding to a multi-function peripheral.

3. A computing device according to claim 1, in which a user designated option indicates whether to print an image in color or in monochrome, and
    the image is printed in color using the color layer of the image file or is printed in monochrome using the monochrome layer of the image file in accordance with the user designated option.

4. A computing device according to claim 1, the computing device provides the color layer to an output device if the output device is color capable, and provides the monochrome layer to the output device if the output device is not color capable.

5. A system comprising the computing device according to claim 1, the system further comprising:
    a hardcopy device that prints an image using the image file generated by the image file generator; and
    a display device that displays the image using the image file generated by the image file generator.

6. A system according to claim 5, the hardcopy device prints the image based on the color layer if the hardcopy device is a color hardcopy device and prints the image using the image file based on the monochrome layer if the hardcopy device is a monochrome hardcopy device.

7. A system according to claim 5, the display device displays the image using the image file based on the color layer if the display device is a color display device and displays the image using the image file based on the monochrome layer if the display device is a monochrome display device.

8. A computing device according to claim 1, the color image data generator generating the color image data from an entirety of the read original image,
    and the monochrome image data generator generating the monochrome image data from the entirety of the read original image.

9. A method for generating an image file having a color layer and a monochrome layer, comprising:
    reading an original image;
    generating color image data from the read original image;
    generating monochrome image data from the read original image;
    performing a first image processing on the color image data, the first image processing including compressing the color image data;
    performing a second image processing, different from the first image processing, on the monochrome image data, the second image processing including compressing the monochrome image data based in part on a weighted average value obtained from the color image data compressed in the first image processing; and
    storing the processed color image data in the image file as the color layer and the processed monochrome image data in the image file as the monochrome layer.

10. A method according to claim 9, further comprising:
    selecting an output device to which to provide the image file;
    providing one of the color layer and the monochrome layer to the selected output device based on the selected output device.

11. A method according to claim 10, the step of providing comprising:
    providing the color layer if the output device is color capable; and
    providing the monochrome layer if the output device is not color capable.

12. A method according to claim 9, further comprising:
    identifying a display device on which to display an image using the image file;
    determining whether the display device is a color display device or a monochrome display device;
    displaying the image using the image file based on the color layer if the display device is a color display device; and
    displaying the image using the image file based on the monochrome layer if the display device is a monochrome display device.

13. A method according to claim 9, further comprising:
    identifying a hardcopy device on which to print an image using the image file;
    determining whether the hardcopy device is a color hardcopy device or a monochrome hardcopy device;
    printing the image using the image file based on the color layer if the hardcopy device is a color hardcopy device; and
    printing the image using the image file based on the monochrome layer if the hardcopy device is a monochrome hardcopy device.

14. A method according to claim 9, the step of generating the monochrome image data comprising:
    converting the generated color image data into the monochrome image data.

15. A method according to claim 9, the step of performing the first image processing comprising:
applying a color conversion process to the color image data and gamma correcting each color of the color image data.

16. A method according to claim 9, the step of performing the second image processing comprising at least one of removing isolated dot noise or whitening of pale color background pixels.

* * * * *